N. BENOIT.
THREAD CUTTING TOOL.
APPLICATION FILED SEPT. 6, 1919.
1,422,652.
Patented July 11, 1922.
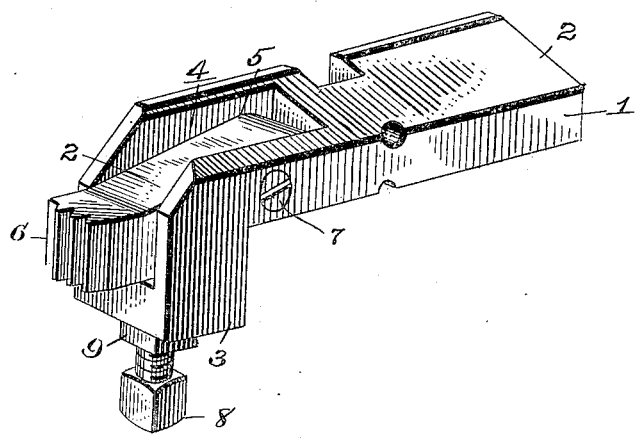
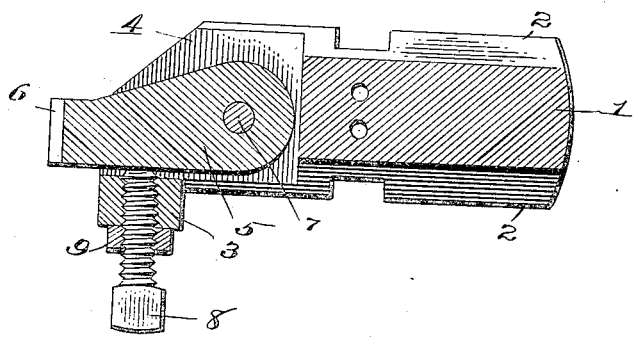
INVENTOR
Napoleon Benoit

UNITED STATES PATENT OFFICE.

NAPOLEON BENOIT, OF WATERVLIET, NEW YORK.

THREAD-CUTTING TOOL.

1,422,652.   Specification of Letters Patent.   Patented July 11, 1922.

Application filed September 6, 1919. Serial No. 322,147.

(FILED UNDER THE ACT OF MARCH 3, 1883, 22 STAT. L., 625.)

*To all whom it may concern:*

Be it known that I, NAPOLEON BENOIT, a citizen of the United States, and a resident of Watervliet, county of Albany, State of New York, have invented an Improvement in Thread-Cutting Tools, of which the following is a specification.

The invention described herein may be used by the Government, or any of its officers or employees in prosecution of work for the Government, or by any other person in the United States, without payment of any royalty thereon.

This invention relates to thread-cutting tools for turret lathes. As customarily constructed, the thread-cutting tool is an integral body comprising a metal bar provided, at one end, with the cutting teeth. In operation, the whole cutting tool slides back and forth, by mechanical means, in a plane at right angles to the axis of the work. The integral cutting tool slides in a groove in the top of the turret-lathe, and, as the cutting tool must accurately fit the groove at all times and as the tool is an integral structure, there is no possible adjustment up and down of the tool. Consequently, in use, as the cutting tool teeth are ground from time to time by wear, they are progressively lower from the center line at successive grindings, with the result that soon the cutting edge is so far below the center line that it is impossible to cut a perfect thread.

The object of my invention is to improve the construction described by providing the reciprocating piece with a separate cutting tool detachably carried thereby, instead of having the cutting teeth in the end of the reciprocating piece, and by providing means for vertically adjusting the tool, thereby making it possible for the cutting edges always to be kept at the proper height with respect to the work. Also, when the cutting tool is worn out, it is not necessary to replace the entire costly sliding piece, but only the cutting tool carried thereby.

The accompanying drawing, forming part of my specification, illustrates a concrete embodiment of the underlying principles of the invention.

Briefly described:

Figure 1 is a perspective view of the device of my invention, and

Figure 2 is a central, vertical, longitudinal section thereof.

Referring, now, in detail to the drawing:

1 designates the sliding piece, constituting the holder for the cutting-tool 5. As shown, the piece is a metal bar provided with the longitudinally extending, angular or inclined faces 2, 2, which bear against the angular or inclined sides or walls of a retaining groove in the top of the turret lathe, whereby the sliding piece is guided in its reciprocatory movement toward and away from the work.

The sliding piece or tool-holder 1 is provided with a lateral angular extension 3.

Said extension 3 and the bar 1 are recessed, as shown at 4. The recess extends vertically entirely through the bar 1, as shown in Fig. 2.

Disposed in said recess is a thread-cutting tool 5, provided, at one end, with the cutting teeth 6, and pivoted to the bar 1 on a pin 7.

Threaded through the extension 3 is an adjusting screw 8 bearing against the cutting tool 5 at a point thereon between the teeth 6 and the pivot-pin 7. The adjusting screw preferably carries a locking nut 9. As will be obvious, as the teeth of the tool are ground from time to time, in use, the cutting-tool may be raised by means of the screw 8, thus keeping the cutting edges always at the proper height with respect to the work.

It will, therefore, be noted that, in my construction, the cutting-teeth are not integral with the reciprocating piece, but are formed on a separate member (constituting the tool proper), which is pivotally connected to the reciprocating piece. Accordingly, when the teeth are entirely worn, the separate member carrying such teeth may be discarded and a new one placed in position in the reciprocating piece 1.

The advantages of my invention will appeal especially to those skilled in the art to which the device pertains.

Having thus fully described my invention, what I claim as new and desire to secure by Letters Patent is:

1. A thread cutting tool, including a holder formed with an angular extension, said holder and extension provided with a recess, the recess extending vertically entirely through the holder, a cutting tool formed with a plurality of cutting teeth mounted in the recess and pivotally connected to the holder and means carried by the extension for adjusting the cutting tool.

2. A thread cutting tool including a holder formed with an angular extension, said holder and extension provided with a recess, a cutter formed with a plurality of cutting teeth mounted for adjustment in the recess and means carried by the extension for adjusting the cutter.

NAPOLEON BENOIT.